(12) United States Patent
Robins

(10) Patent No.: US 9,981,610 B2
(45) Date of Patent: May 29, 2018

(54) AUTOMOBILE ACCESSORY

(71) Applicant: Threeman LLC, Exton, PA (US)

(72) Inventor: Daniel Robins, Exton, PA (US)

(73) Assignee: Threeman LLC, West Chester, PA (US)

( * ) Notice: Subject to any disclaimer, the term of this patent is extended or adjusted under 35 U.S.C. 154(b) by 0 days. days.

(21) Appl. No.: 14/912,296

(22) PCT Filed: Jul. 30, 2014

(86) PCT No.: PCT/US2014/048845
§ 371 (c)(1),
(2) Date: Feb. 16, 2016

(87) PCT Pub. No.: WO2015/023436
PCT Pub. Date: Feb. 19, 2015

(65) Prior Publication Data
US 2016/0280140 A1    Sep. 29, 2016

Related U.S. Application Data

(60) Provisional application No. 61/866,536, filed on Aug. 15, 2013.

(51) Int. Cl.
*B60R 7/00* (2006.01)
*B60R 7/04* (2006.01)
(52) U.S. Cl.
CPC ............... *B60R 7/005* (2013.01); *B60R 7/04* (2013.01); *B60R 7/043* (2013.01)

(58) Field of Classification Search
CPC ............ B60R 7/005; B60R 7/04; B60R 7/043
See application file for complete search history.

(56) References Cited

U.S. PATENT DOCUMENTS

| 3,863,283 | A | 2/1975 | Mohr |
| 8,162,189 | B2 | 4/2012 | Robins |
| 2003/0122392 | A1 | 7/2003 | Larsen et al. |
| 2008/0272166 | A1* | 11/2008 | Frank .................. B60R 7/04 224/544 |
| 2009/0127882 | A1* | 5/2009 | Thibodeau .............. B60R 7/043 296/37.8 |

FOREIGN PATENT DOCUMENTS

| KR | 10-0216611 B1 | 8/1999 |
| WO | 2012125846 A1 | 9/2012 |

* cited by examiner

*Primary Examiner* — D Glenn Dayoan
*Assistant Examiner* — Melissa A Black
(74) *Attorney, Agent, or Firm* — Gerry J. Elman; Elman Technology Law, P.C.

(57) ABSTRACT

This envelope is an automobile accessory adapted to fit between the center console of an automobile and either the driver's seat or the passenger's seat, to catch items that fall in the space between the seat and the console. The sides of this envelope are made of flexible polymeric material that allows it to compress to fit in this space. The resilient force generated as the sides of the envelope seek to return to their uncompressed shape holds the envelope fairly securely in the space. Yet a user is able to slide the envelope into and out of the space easily. The envelope can be used to store items as well as to catch dropped ones.

6 Claims, 6 Drawing Sheets

AUTOMOBILE ACCESSORY

CROSS-REFERENCE TO RELATED APPLICATIONS

This application is a U.S. national stage application of PCT/US2014/048845, filed Jul. 30, 2014, which in turn claims priority to U.S. Provisional Application 61/866,536, filed Aug. 15, 2013. Both of these related applications are incorporated by reference.

BACKGROUND OF THE INVENTION

Technical Field

The present invention pertains to automobile accessories, more specifically, to accessories adapted to catch items that fall into the space between the center console and one of the front seats of a vehicle.

Related Art

Pouches to catch items that fall into these spaces have been described elsewhere. See, for example, U.S. Pat. No. 8,162,189 B2 and the prior art cited in it. However, they all fail in some aspect to be entirely optimal. The material of which some were fabricated may have been too rigid, so that such pouches didn't fit each of the intended spaces. In other designs, the pouches needed to be secured in place by cumbersome attachment means. In still other designs, the pouches were difficult to insert and remove from the spaces.

BRIEF SUMMARY OF THE INVENTION

The present invention is an automobile accessory for catching items that would otherwise fall between an automobile seat and the center console. At the most general level of description, the accessory comprises an envelope that fits between the center console of an automobile and either the driver's seat or the passenger's seat and has a shape and particular resiliency that facilitates its placement between a seat and console, its stability once placed, and its ready removal. This overcomes deficiencies of previously disclosed accessories: it is easy to install and remove, it requires no additional means of attachment, and it fits essentially all popular vehicle makes and models.

In this patent specification, the term "envelope" means a pouch-like holder or sleeve with an open top and closed base, rather than the paper envelopes with flap closures that typically enclose postal mail.

Although an envelope in accordance with the invention is preferably fabricated as a unitary structure cast in a single mold, it's simplest to describe the envelope's shape as being formed by a pair of generally upstanding sides tapering upwards and outwards from a narrow linear base and together defining an opening at the top of the envelope that, when it isn't subjected to lateral force, is generally elliptical in plan view.

This elliptical top opening has a width of approximately 3.5 inches in the middle and approximately an inch near each end. The minor axis, or width, of the envelope, tapers down towards the base, to approximately 0.75 inches near the middle and a similar measurement near the ends.

The major axis, or length, of the opening at the top of the envelope is about 14 inches, and the base is about 12.5 inches long. Measured vertically at midpoint, the envelope is about 4.5 inches from top to base, and about 4 inches in height from top to base at the ends.

The envelope of the present invention is composed of flexible material that responds to lateral force by allowing some compression of the sides in the direction of the minor axis so that the envelope can be readily squeezed into the space between the center console and a front seat of a user's vehicle. The walls of the envelope are adapted to resist compression to a certain degree, due to the combination of the envelope's material and thickness. In resisting compression, the sides of the envelope generate a rebounding force that tends, without more, to hold the envelope in place between a seat and vehicle console until the user chooses to remove it. Moreover, the size and compressibility of the envelope allow it to fit almost all makes and models of passenger automobiles.

Through experimentation, we found the optimal result when the sides of an envelope as described above have the particular resiliency to exert a force of about 0.55 to about 0.75 pounds per square inch in the center of the sides when the envelope is between a vehicle seat and console.

We have further found that such a resiliency is desirably provided by an envelope of polymeric material having flexible sides of generally uniform thickness of about 0.125 inch. Optimally, the polymeric material is a resilient and dishwasher-safe substance of about 70% polypropylene and 30% thermoplastic rubber.

In addition to the accessory itself, the present invention contemplates the following methods of using the accessory. One method of using the accessory is: 1) orienting the envelope in front of the space between the center console of an automobile and either the driver's seat or the front passenger's seat; 2) manually compressing the envelope laterally to reduce its width to less than the width of the space; 3) inserting the envelope into the space; and 4) releasing compression on the envelope, allowing it to expand. Once the envelope has been placed into that space, items that would otherwise fall onto the floor between the console and the seat will fall into the envelope instead. Additionally, the envelope could be used for item storage.

Another method of using the accessory is: 1) orienting the envelope in front of the space between the center console of an automobile and either the driver's seat or the front passenger's seat; 2) manually exerting force on the envelope along its major axis so as to move it towards and into the space while the console and seat exert inward lateral force on the sides of the envelope to compress it to match the width of the space; and 3) manually releasing force on the envelope when it is resting in the desired space.

In one aspect, the present invention provides an automobile accessory comprising an envelope of dishwasher-safe, resilient, flexible material having a substantially V-shaped cross-section with an open top, a base, a first side, a second side, a first end, and a second end, the length of the top being approximately 14 inches, the width of the top at the ends being approximately 1 inch, the width of the top in its center being approximately 3.5 inches, the length of the base being approximately 12.5 inches, the width of the base being approximately 0.75 inch, the height of the sides at the ends being approximately 4 inches, the height of the sides at their middles being approximately 4.5 inches, and wherein the sides have the particular resiliency to exert a force of about 0.55 to about 0.75 pounds per square inch in the center of the sides when the envelope is between a vehicle seat and console.

In another aspect of the invention, the present invention further provides an automobile accessory as described above wherein the thickness of the aforesaid sides is approximately 0.125 inch.

In another aspect of the invention, the present invention further provides an automobile accessory as described above, wherein the composition of the sides is approximately 70% polypropylene, 30% thermoplastic rubber.

In another aspect, the present invention provides a method of using an automobile accessory comprising:

an envelope of dishwasher-safe, resilient, flexible material having a substantially V-shaped cross-section with an open top, a base, a first side, a second side, a first end, and a second end, the length of the top being approximately 14 inches, the width of the top at the ends being approximately 1 inch, the width of the top in its center being approximately 3.5 inches, the length of the base being approximately 12.5 inches, the width of the base being approximately 0.75 inch, the height of the sides at the ends being approximately 4 inches, the height of the sides at their middles being approximately 4.5 inches, and wherein the sides have the particular resiliency to exert a force of about 0.55 to about 0.75 pounds per square inch in the center of the sides when the envelope is between a vehicle seat and console, the method comprising:

a) orienting the envelope in front of a space having a width between a center console of an automobile and either a driver's seat or a front passenger's seat, with the sides of the envelope facing towards the center console and the seat;

b) applying a force to bring an end of the envelope into the space;

c) continuing to apply a force to the envelope in substantially the same direction until the envelope sits securely between the center console and the seat.

In another aspect, the present invention provides a method of using an automobile accessory, as previously described, further comprising:

d) after one or more items have collected inside the envelope, retrieving one or more of the items with the envelope still situated between a seat and the center console.

In another aspect, the present invention provides a method of using an automobile accessory, as previously described, further comprising:

d) after one or more items have collected inside the envelope, removing the envelope from the space; and e) dumping the items out of the envelope.

DETAILED DESCRIPTION

Figure 1:
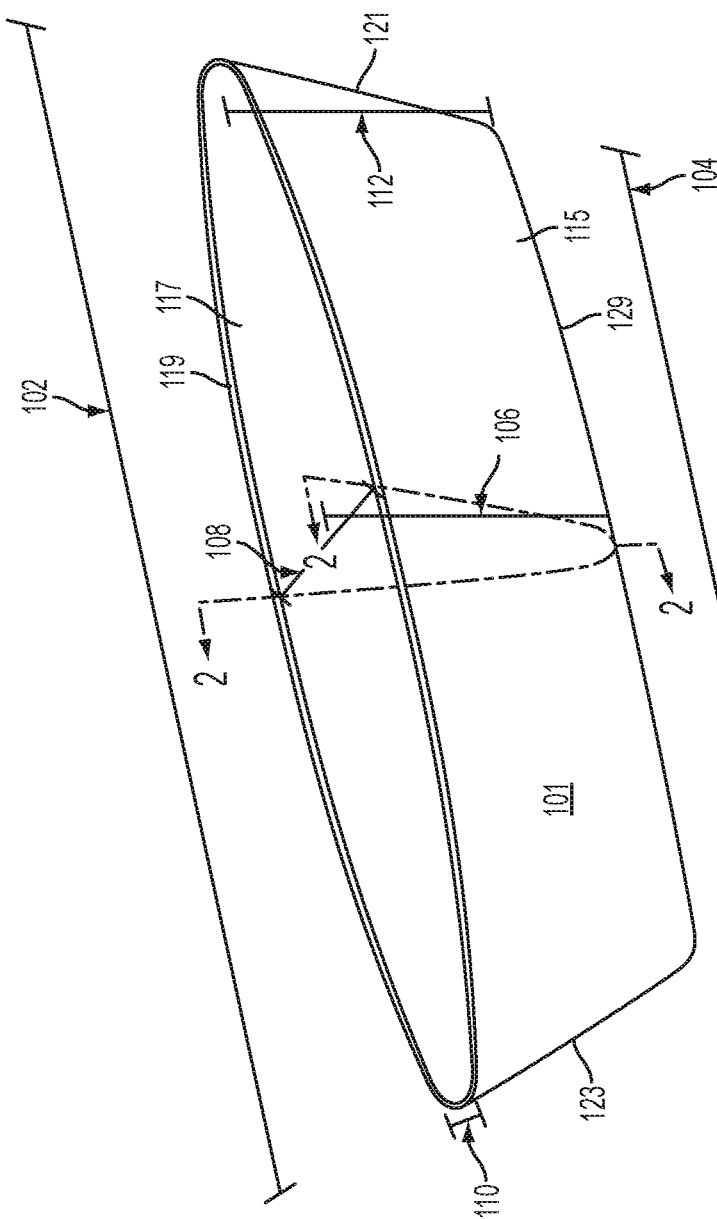
FIG. 1 is a perspective view of an automobile accessory of the present invention.

FIG. 1 is a perspective view of an automobile accessory of the present invention 101. The accessory 101 is in the shape of an envelope having a first side 115, a second side 117, a first end 121, a second end 123, a base 129, and an open top 119. The dimensions of the accessory 101 are as follows:

the top length 102 is approximately 14 inches, the top end width 110 is approximately 1 inch, the top center width 108 is approximately 3.5 inches, the base length 104 is approximately 12.5 inches, the side end height 112 is approximately 4 inches, and the side center height 106 is approximately 4.5 inches.

The accessory 101 shown in FIG. 1 is intended for use with most automobile makes and models. The envelope is intended to rest on or near to the floorboard of the automobile.

Figure 2:
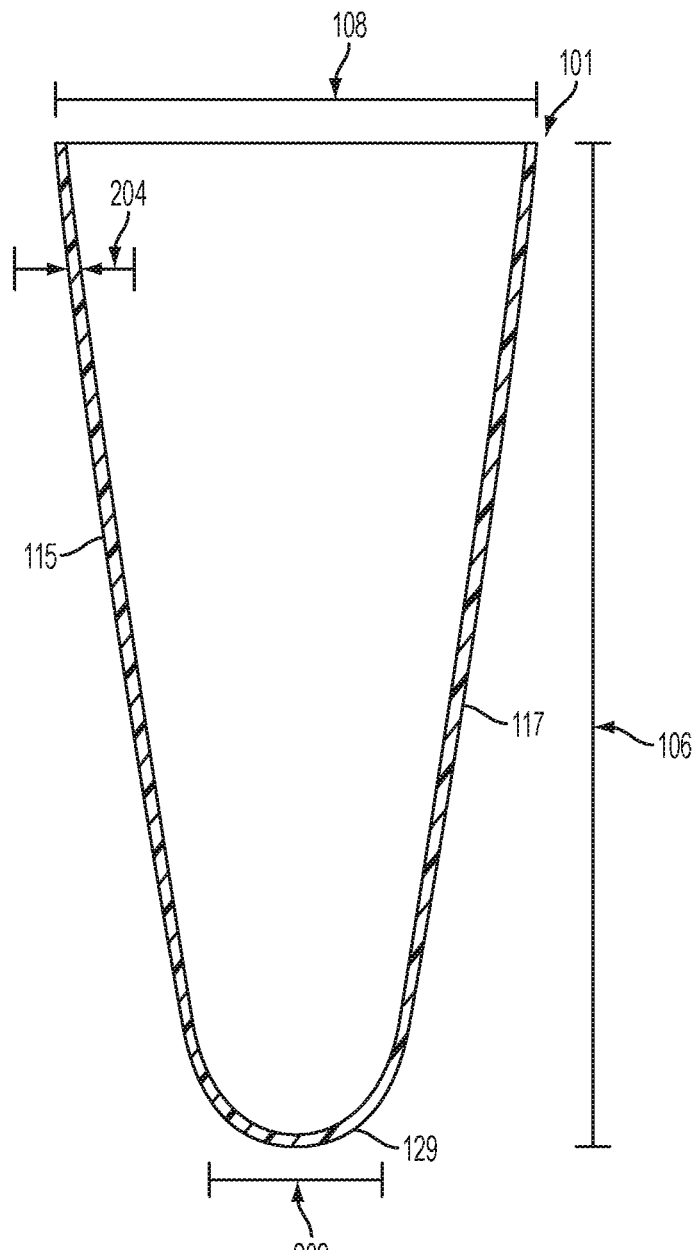
FIG. 2 is a vertical cross-section of the automobile accessory of FIG. 1, taken along the line 2-2-2.

FIG. 2 is a cross-sectional view of the automobile accessory 101 of FIG. 1, taken along the dashed line 2-2-2. This view shows a cross-section near the center of the sides of the accessory 101. Visible here are the first side 115, the second side 117, and the base 129 of the envelope. The width 202 of base 129 is approximately 0.75 inches. Unlike the width of the top, the base width is approximately the same over the entire length of the accessory 101. The side center height 106 is illustrated in this Figure, as is the top center width 108.

Also illustrated here is the wall thickness 204, which is approximately 0.125 inches. The material of the envelope walls is a mix of 70% polypropylene, 30% thermoplastic rubber. This combination of material and thickness make the accessory resilient enough to allow compression and re-expansion without the need to employ a separate shape-retaining element. This material is flexible, resilient, and dishwasher-safe.

Figure 3:
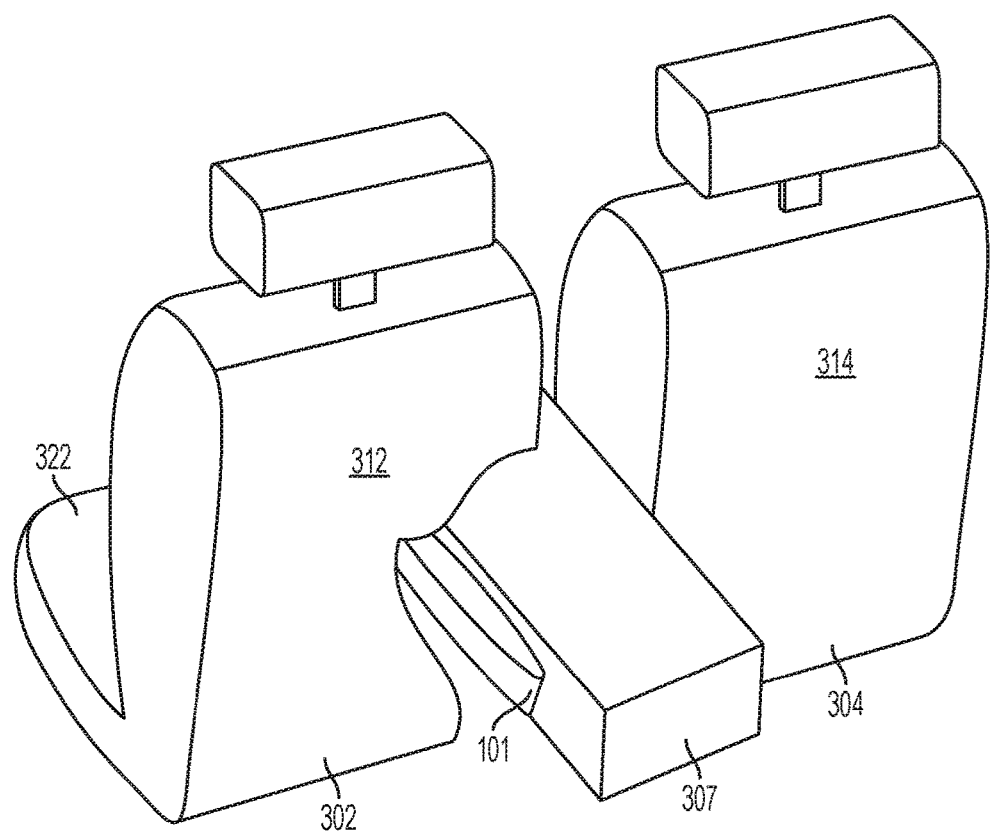
FIG. 3 is a perspective, partial cutaway view, showing an automobile accessory of the invention secured between the driver's seat and the center console of an automobile.

FIG. 3 is a perspective, partial cutaway view showing an automobile accessory 101 of the invention as properly installed. Driver's seat 312 is partially cut away to show the position of the automobile accessory 101 positioned to rest between the driver's seat 312 and the center console 307. Also visible are the rear of the driver's backrest 302, the driver's seat base 322, the passenger's seat 314, and the rear of the passenger's backrest 304. Please understand that the automobile accessory 101 may be used between the driver's seat 312 and the center console 307 or alternatively the passenger's seat 314 and the center console 307, as desired. Of course, two such accessories may desirably be so deployed for maximum benefit.

Figure 4:
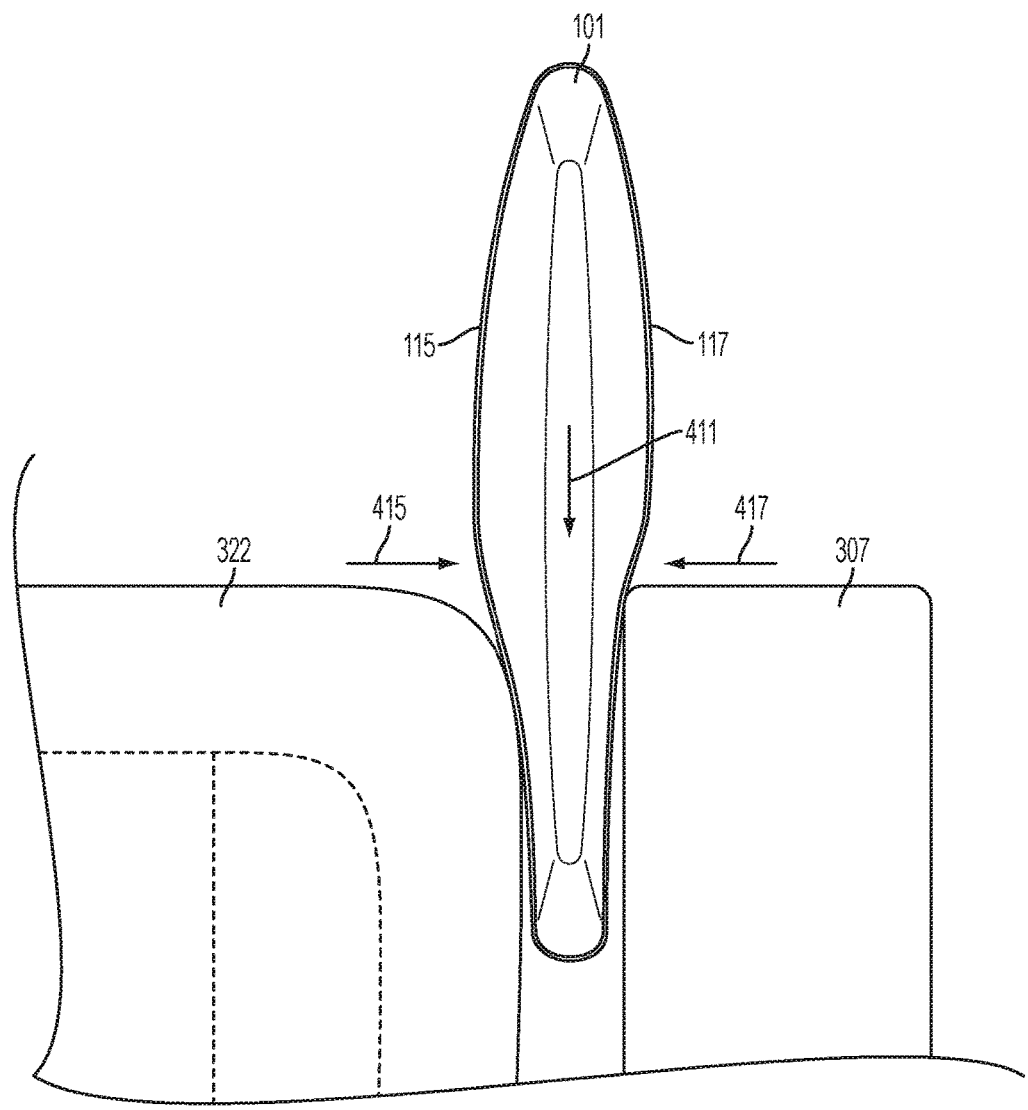
FIG. 4 is a close-up plan view showing an automobile accessory of the invention deforming as it enters the space between the driver's seat and the center console of an automobile.

FIG. 4 is a close-up plan view showing the automobile accessory 101 deforming as it is caused by a user to enter the space between the driver's seat base 322 and the center console 307 of an automobile. The accessory 101 is first positioned in front of the space between the driver's seat base 322 and the center console 307, then the accessory 101 is slid into the space in the direction 411. As the accessory 101 is being slid into the space, the first side 115 and the second side 117 deform towards one another, the first side 115 deforming in the direction 415, the second side 117 deforming in the direction 417.

To remove the accessory, the user simply slides the accessory back out, opposite to direction 411. If used between the passenger's seat and the center console, the accessory is installed and removed through the space between those two instead. This easy-in, easy-out sliding speeds up placement and removal of the accessory and makes the present accessory significantly more efficient to use than other pouches with a similar purpose.

Figure 5:
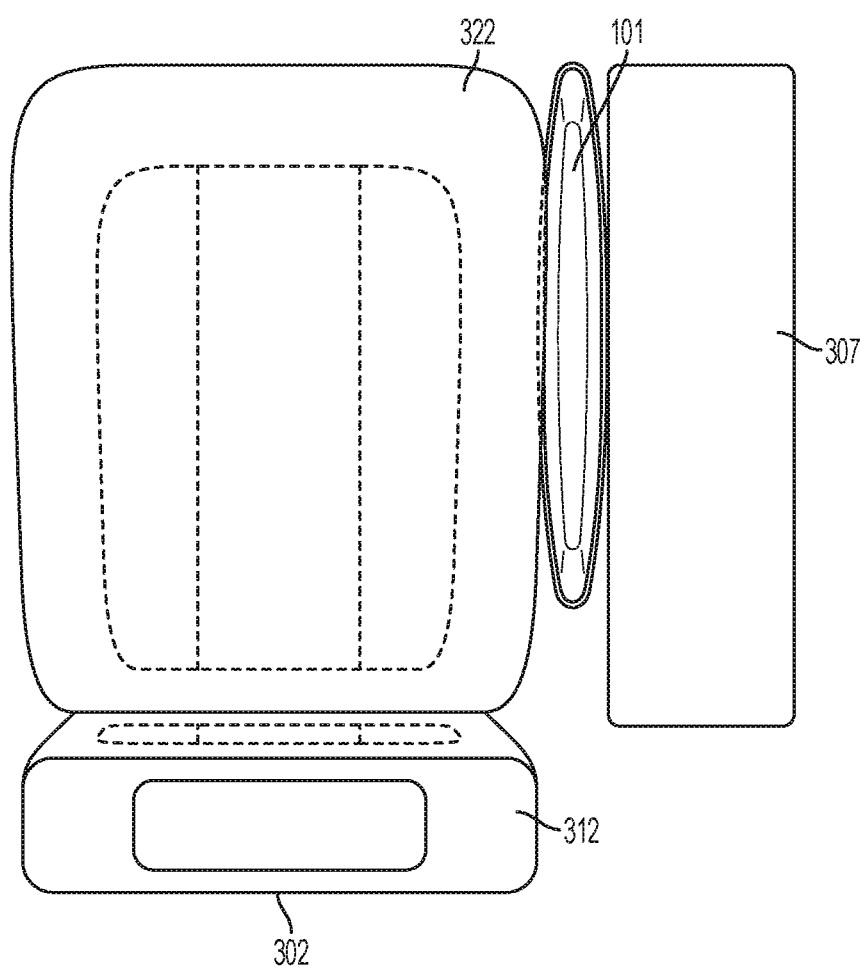
FIG. 5 is a plan view showing an automobile accessory of the invention that has been securely placed between the driver's seat and the center console of an automobile.

FIG. 5 is a plan view showing the automobile accessory 101 staying in place for use. The user may choose to remove the accessory 101 to empty its contents or simply remove the items from accessory 101 as desired. Also visible is the rear of the driver's backrest 302 and the driver's seat base 322. The automobile accessory 101 in FIG. 5 rests between the driver's seat 312 and the center console 307.

Figure 6:
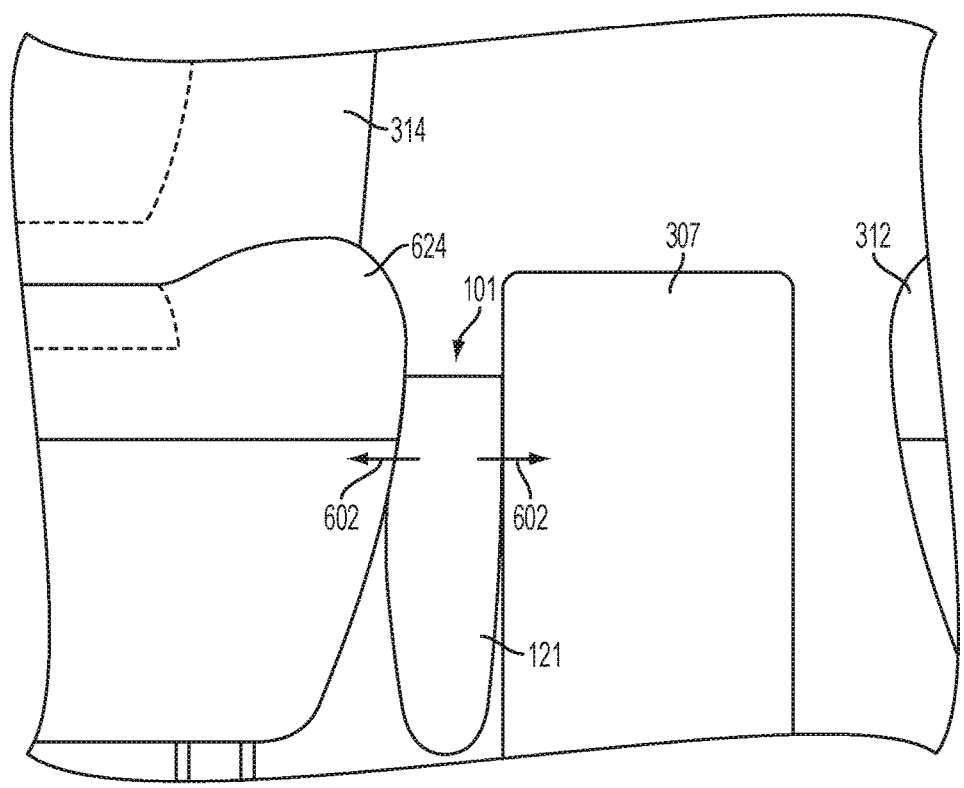
FIG. 6 is a perspective view showing an automobile accessory of the invention that has been securely placed between the passenger's seat and the center console of an automobile.

FIG. 6 is a close-up perspective view of the automobile accessory 101 of the present invention, looking towards its first end 121. The automobile accessory 101 is desirably shaped symmetrically so that there would be no difference in shape regardless of which of the two ends 121 or 123 is placed closest to the back (or front) of the automobile. Here the automobile accessory 101 is shown as having been placed between the center console 307 and the passenger's seat 314. Also shown is the base 624 of the passenger's seat base 314. A small portion of the driver's seat 312 is also visible in this Figure.

The thickness of the sides of the automobile accessory 101 and the material of which they are constructed provide a particular degree of elasticity and resilience to the accessory. When compressed into the space between the passenger's seat 314 and the center console 307, the automobile accessory 101 seeks to return to its original shape as shown in FIG. 1. This rebounding force 602 presses against the passenger's seat 314 and the center console 307 with a force of 0.55 to 0.75 pounds per square inch, as measured at about the center of the sides of the automobile accessory 101. This rebounding force 602 tends to hold the automobile accessory 101 in place, without use of any attachment means. It should be understood that the deformation and rebounding force work similarly regardless of whether the automobile accessory 101 is placed between the driver's seat 312 and the center console 307 or the passenger's seat 314 and the center console 307.

The above-described embodiment is intended to illustrate the principles of the invention, but not necessarily to limit its scope. Other embodiments and variations will be apparent to those skilled in the art and may be made without departing from the spirit and scope of the invention.

I claim:

1. An automobile accessory comprising an envelope of dishwasher-safe, resilient, flexible material having a substantially V-shaped cross-section with an open top, a base, a first side, a second side, a first end, and a second end,
   the length of the top being approximately 14 inches,
   the width of the top at the ends being approximately 1 inch,
   the width of the top in its center being approximately 3.5 inches,
   the length of the base being approximately 12.5 inches,
   the width of the base being approximately 0.75 inch,
   the height of the sides at the ends being approximately 4 inches,
   the height of the sides at their middles being approximately 4.5 inches,
   and wherein the sides have the particular resiliency to exert a force of about 0.55 to about 0.75 pounds per square inch in the center of the sides when the envelope is between a vehicle seat and console.

2. The automobile accessory of claim 1, wherein the thickness of the aforesaid sides is approximately 0.125 inch.

3. The automobile accessory of claim 1, wherein the composition of the sides is approximately 70% polypropylene, 30% thermoplastic rubber.

4. A method of using an automobile accessory, the automobile accessory comprising:
   an envelope of dishwasher-safe, resilient, flexible material having a substantially V-shaped cross-section with an open top, a base, a first side, a second side, a first end, and a second end,
   the length of the top being approximately 14 inches,
   the width of the top at the ends being approximately 1 inch,
   the width of the top in its center being approximately 3.5 inches,
   the length of the base being approximately 12.5 inches,
   the width of the base being approximately 0.75 inch,
   the height of the sides at the ends being approximately 4 inches,
   the height of the sides at their middles being approximately 4.5 inches,
   and wherein the sides have the particular resiliency to exert a force of about 0.55 to about 0.75 pounds per square inch in the center of the sides when the envelope is between a vehicle seat and console,
   the method comprising:
   a) orienting the envelope in front of a space having a width between a center console of an automobile and either a driver's seat or a front passenger's seat, with the sides of the envelope facing towards the center console and the seat;
   b) applying a force to bring an end of the envelope into the space;
   c) continuing to apply a force to the envelope in substantially the same direction until the envelope sits securely between the center console and the seat.

5. The method of claim 4, further comprising:
   d) after one or more items have collected inside the envelope, retrieving one or more of the items with the envelope still situated between a seat and the center console.

6. The method of claim 4, further comprising:
   d) after one or more items have collected inside the envelope, removing the envelope from the space; and
   e) dumping the items out of the envelope.

* * * * *